United States Patent
Kwak et al.

(10) Patent No.: US 9,466,823 B2
(45) Date of Patent: Oct. 11, 2016

(54) RECHARGEABLE BATTERY

(71) Applicant: SAMSUNG SDI CO., LTD., Yongin-si, Gyeonggi-do (KR)

(72) Inventors: Yun-Jung Kwak, Yongin-si (KR); Jeong-Won Oh, Yongin-si (KR); Seok-Yoon Yoo, Yongin-si (KR); Chi-Young Lee, Yongin-si (KR); Min-Seok Koo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 213 days.

(21) Appl. No.: 13/962,915

(22) Filed: Aug. 8, 2013

(65) Prior Publication Data

US 2014/0242426 A1 Aug. 28, 2014

Related U.S. Application Data (60) Provisional application No. 61/770,977, filed on Feb. 28, 2013.

(51) Int. Cl.
| | |
|---|---|
| *H01M 2/34* | (2006.01) |
| *H01M 2/26* | (2006.01) |
| *H01M 10/6553* | (2014.01) |
| *H01M 10/654* | (2014.01) |
| *H01M 10/6551* | (2014.01) |
| *H01M 10/6554* | (2014.01) |

(Continued)

(52) U.S. Cl.
CPC ............ *H01M 2/348* (2013.01); *H01M 2/263* (2013.01); *H01M 10/613* (2015.04); *H01M 10/654* (2015.04); *H01M 10/6551* (2015.04); *H01M 10/6553* (2015.04); *H01M 10/6554* (2015.04); *H01M 10/647* (2015.04); *H01M 2200/103* (2013.01)

(58) Field of Classification Search
CPC .......... H01M 10/613; H01M 10/647; H01M 10/654; H01M 10/6551; H01M 10/6553
USPC ......................................................... 429/61
See application file for complete search history.

(56) References Cited

U.S. PATENT DOCUMENTS

| | | | |
|---|---|---|---|
| 4,734,341 A | 3/1988 | Descroix et al. | |
| 5,401,595 A | 3/1995 | Kagawa et al. | |

(Continued)

FOREIGN PATENT DOCUMENTS

| | | |
|---|---|---|
| EP | 2515363 A1 | 10/2012 |
| JP | 5-159808 | 6/1993 |

(Continued)

OTHER PUBLICATIONS

Extended European Search Report dated Jun. 12, 2014, for European Application No. 13181277.8, 6 pgs.

(Continued)

*Primary Examiner* — Jonathan Jelsma
*Assistant Examiner* — Rashid Alam
(74) *Attorney, Agent, or Firm* — Lewis Roca Rothgerber Christie LLP (57) ABSTRACT

A rechargeable battery including an electrode assembly, a case housing the electrode assembly, a cap plate coupled to the case, a first electrode terminal on the cap plate, and a first lead tab electrically connecting the electrode assembly and the first electrode terminal, wherein the first lead tab has a cell fuse and a heat dissipating member coupled to the first lead tab and spaced from the cell fuse.

14 Claims, 11 Drawing Sheets

(51) Int. Cl.
*H01M 10/613* (2014.01)
*H01M 10/647* (2014.01)

(56) References Cited

U.S. PATENT DOCUMENTS

| | | | |
|---|---|---|---|
| 2002/0061438 A1* | 5/2002 | Inoue et al. | 429/161 |
| 2011/0183193 A1 | 7/2011 | Byun et al. | |
| 2011/0244281 A1 | 10/2011 | Byun | |
| 2012/0021278 A1 | 1/2012 | Byun et al. | |
| 2012/0148884 A1 | 6/2012 | Kim | |
| 2012/0263976 A1 | 10/2012 | Byun et al. | |
| 2012/0270089 A1* | 10/2012 | Kim | H01M 2/0217 429/120 |
| 2013/0230745 A1* | 9/2013 | Yong et al. | 429/7 |
| 2014/0023913 A1* | 1/2014 | Yokoyama et al. | 429/179 |

FOREIGN PATENT DOCUMENTS

| | | |
|---|---|---|
| JP | 2008-226828 A | 9/2008 |
| KR | 10-1042808 B1 | 6/2011 |
| KR | 10-2012-0002406 A | 1/2012 |
| KR | 10-2012-0010092 A | 2/2012 |
| KR | 10-2012-0064237 | 6/2012 |
| KR | 10-2012-0118315 | 10/2012 |

OTHER PUBLICATIONS

EPO Office action dated Apr. 19, 2016, for corresponding European Patent application 13181277.8, (4 pages).

KIPO Office action dated Aug. 12, 2016, with English translation, for corresponding Korean Patent Application No. 10-2013-0103293 (14 pages).

* cited by examiner

RECHARGEABLE BATTERY

CROSS-REFERENCE TO RELATED APPLICATION

This application claims priority to and the benefit of U.S. Provisional Application No. 61/770,977, filed on Feb. 28, 2013 in the U.S. Patent and Trademark Office, the entire content of which is incorporated herein by reference

BACKGROUND

1. Field

The described technology relates generally to a rechargeable battery that has a cell fuse in a lead tab.

2. Description of the Related Art

A rechargeable battery can repeatedly perform charge and discharge, unlike a primary battery which can only be discharged once. A rechargeable battery of a small capacity is used for a small portable electronic device like a mobile phone or a laptop computer and a camcorder, and a rechargeable battery of a large capacity is used as a power source for driving a motor of a hybrid vehicle and an electric vehicle.

For example, the rechargeable battery typically includes an electrode assembly that performs charge and discharge operations, a case that houses the electrode assembly and an electrolyte solution, a cap plate that is coupled to an opening portion of the case, and a lead tab that electrically connects the electrode assembly to an electrode terminal.

In a rechargeable battery cell, a lead tab forms a cell fuse between a portion that is connected to an electrode assembly and a portion that is connected to an electrode terminal. For example, because a cell fuse is formed in a current passage having a small area, a periphery of the cell fuse has lower heat dissipating characteristics.

In a high current area such as an external short circuit of a rechargeable battery, because an operation time in which a cell fuse is cut is short, the cell fuse is less affected by heat. However, in a low current area, because an operation time in which a cell fuse is cut is long, the cell fuse is largely affected by heat.

In a low current area, due to deterioration of heat dissipating characteristics of a lead tab and a cell fuse, operation time of the cell fuse is excessively shortened, and thus a cell fuse may be cut earlier than a pack fuse that interrupts a current of an entire rechargeable battery pack. In this case, the rechargeable battery cell should be replaced.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having advantages of extending an operation time of a cell fuse in a low current area by improving heat dissipating characteristics of a lead tab and the cell fuse.

An exemplary embodiment provides a rechargeable battery including: an electrode assembly that performs charge and discharge operations; a case that houses the electrode assembly; a cap plate that is coupled to an opening portion of the case; an electrode terminal that is installed in the cap plate; and a lead tab that connects the electrode assembly to the electrode terminal. The lead tab includes: a first connection portion that is connected to the electrode terminal; a second connection portion that is bent from the first connection portion to be connected to the electrode assembly; a cell fuse that has a smaller area than a peripheral area in the first connection portion; and a heat dissipating member that is separated from the cell fuse to be provided in the second connection portion.

The heat dissipating member may be formed as a block that is disposed between the electrode assembly and the second connection portion.

The heat dissipating member may be installed by one of welding and caulking at the second connection portion.

The heat dissipating member and the second connection portion may be opposite each other and may be connected through surface contact. The heat dissipating member and the second connection portion may be connected through curved surface contact.

The heat dissipating member may be formed with heat dissipating fins that are disposed between the electrode assembly and the second connection portion. The heat dissipating member and the second connection portion may be connected through curved surface contact.

The heat dissipating member may include a block that is disposed between the electrode assembly and the second connection portion and a thermally conductive plate that is disposed between the block and the second connection portion.

The block and the thermally conductive plate may be connected through curved surface contact, and the thermally conductive plate and the second connection portion may be connected through curved surface contact.

Another embodiment provides a rechargeable battery including: an electrode assembly that performs charge and discharge operations; a case that houses the electrode assembly; a cap plate that is coupled to an opening portion of the case; an electrode terminal that is installed in the cap plate; and a lead tab that connects the electrode assembly to the electrode terminal. The lead tab includes: a first connection portion that is connected to the electrode terminal; a second connection portion that is connected to the electrode assembly; a cell fuse that has a smaller area than a peripheral area between the first connection portion and the second connection portion; and a heat dissipating member that is separated from the cell fuse and that is provided at one side of the first connection portion and the second connection portion.

According to an exemplary embodiment, by providing a heat dissipating member at one side of a cell fuse of a lead tab, heat of a periphery of a cell fuse is dissipated by the heat dissipating member, and thus heat dissipation characteristics of the lead tab and the cell fuse can be improved. Therefore, heat that is conducted to the cell fuse is reduced or intercepted and thus the cell fuse is less affected by heat even in a low current area. That is, because an operation time of the cell fuse is extended, the cell fuse is maintained until a pack fuse is cut. Therefore, after the pack fuse is replaced, a rechargeable battery cell can be continuously used.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Figure 1:
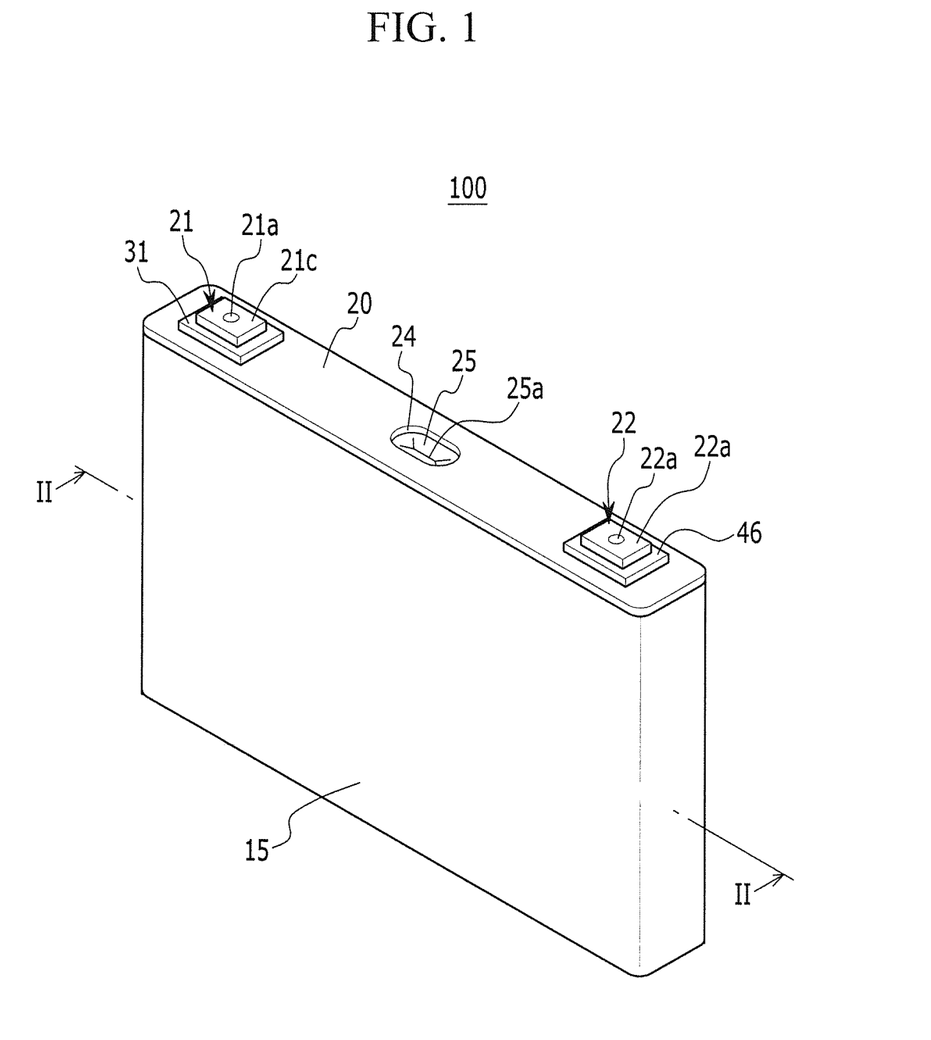
FIG. 1 is a perspective view of a rechargeable battery according to a first exemplary embodiment of the present invention.
Figure 2:
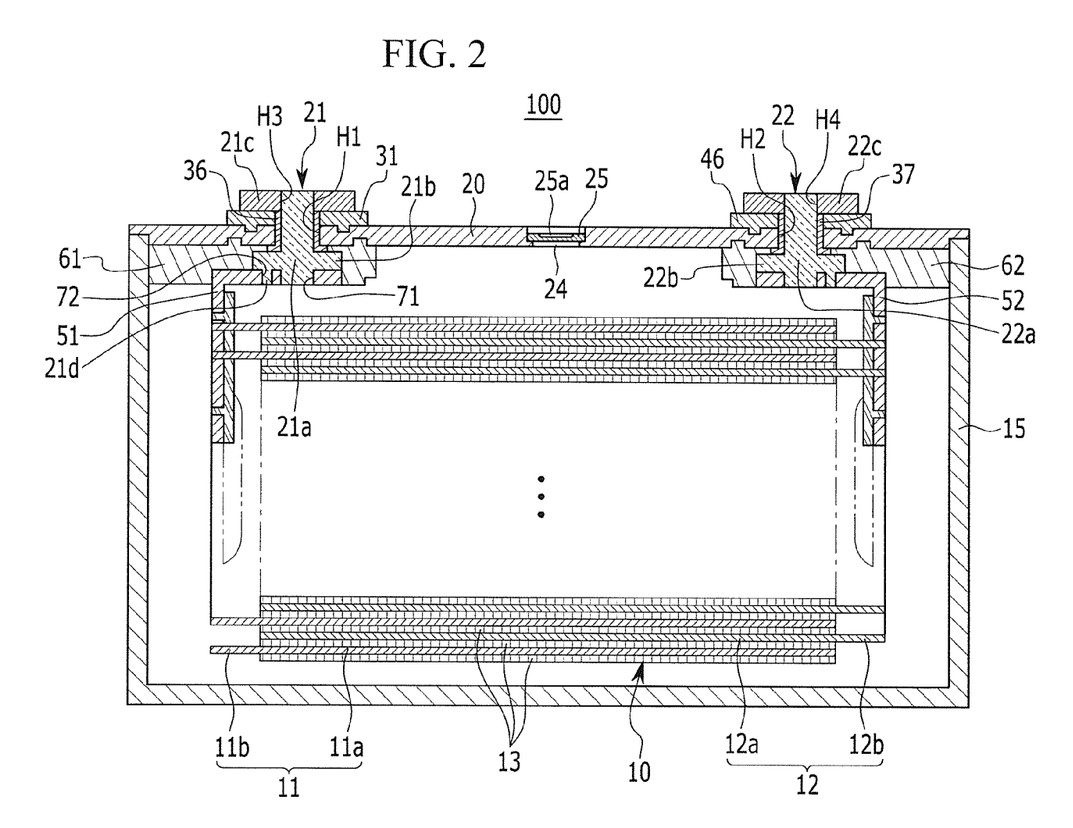
FIG. 2 is a cross-sectional view of the rechargeable battery taken along line II-II of FIG. 1.

FIG. 1 is a perspective view of a rechargeable battery according to a first exemplary embodiment of the present invention, and FIG. 2 is a cross-sectional view of the rechargeable battery taken along line II-II of FIG. 1. Referring to FIGS. 1 and 2, a rechargeable battery cell 100 according to the first exemplary embodiment includes an electrode assembly 10 that charges and discharges a current, a case 15 that houses the electrode assembly 10 and an electrolyte solution, a cap plate 20 that is coupled to an opening portion of the case 15, an electrode terminal (e.g., a negative terminal 21 and a positive terminal 22) that is installed in the case 15, and a lead tab (e.g., a negative electrode lead tab 51 and a positive electrode lead tab 52) that connects the negative terminal 21 and the positive terminal 22 to the electrode assembly 10.

For example, the electrode assembly 10 is formed by placing an electrode (e.g., a negative electrode 11 and a positive electrode 12) at both surfaces of a separator 13, which is an insulator, and by spiral-winding the negative electrode 11, the separator 13, and the positive electrode 12 in a jellyroll state.

The negative electrode 11 and the positive electrode 12 respectively include coated regions 11a and 12a in which an active material is applied to a current collector of a metal plate and uncoated regions 11b and 12b that are formed with an exposed current collector because an active material is omitted.

The uncoated region 11b of the negative electrode 11 is formed in an end portion of one side of the negative electrode 11 along the spiral-wound negative electrode 11. The uncoated region 12b of the positive electrode 12 is formed in an end portion of one side of the positive electrode 12 along the spiral-wound positive electrode 12. The uncoated regions 11b and 12b are each located at opposite ends of the electrode assembly 10.

The case 15 is formed in an approximate cuboid shape to form a space that houses the electrode assembly 10. An opening portion of the case 15 is formed at one side of the cuboid shape to enable the electrode assembly 10 to be inserted from the outside into the internal space.

The cap plate 20 is installed in an opening portion of the case 15 to close and seal the case 15. In one embodiment, the case 15 and the cap plate 20 are made of aluminum to be welded to each other. That is, after the electrode assembly 10 is inserted into the case 15, the cap plate 20 is welded to the opening portion of the case 15.

Further, the cap plate 20 has at least one opening, and has, for example, terminal holes H1 and H2 and a vent hole 24. The negative terminal 21 and the positive terminal 22 are installed in the terminal holes H1 and H2, respectively, of the cap plate 20 to be electrically connected to the electrode assembly 10.

That is, the negative terminal 21 is electrically connected to the negative electrode 11 of the electrode assembly 10, and the positive terminal 22 is electrically connected to the positive electrode 12 of the electrode assembly 10. Therefore, the electrode assembly 10 is drawn out to the outside of the case 15 through the negative terminal 21 and the positive terminal 22.

The negative terminal 21 and the positive terminal 22 include plate terminals 21c and 22c that are located at the outside of the cap plate 20 to correspond to the terminal holes H1 and H2, and rivet terminals 21a and 22a that are electrically connected to the electrode assembly 10 and that are fastened to the plate terminals 21c and 22c by penetrating the terminal holes H1 and H2, respectively.

The plate terminals 21c and 22c have through-holes H3 and H4, respectively. The rivet terminals 21a and 22a penetrate the terminal holes H1 and H2 at an upper end portion to be inserted into the through-holes H3 and H4. The negative terminal 21 and the positive terminal 22 further include flanges 21b and 22b that are integrally widely formed in the rivet terminals 21a and 22a, respectively, at the inside of the cap plate 20.

An external insulation member 31 is located between the cap plate 20 and the plate terminal 21c of the negative terminal 21 side to electrically insulate the plate terminal 21c and the cap plate 20. That is, the cap plate 20 maintains an electrically insulated state from the negative terminal 21.

By coupling the insulation member 31 and the plate terminal 21c to an upper end portion of the rivet terminal 21a and by riveting or welding the upper end portion, the insulation member 31 and the plate terminal 21c are fastened to the upper end portion of the rivet terminal 21a. The plate terminal 21c is installed at the outside of the cap plate 20 with the insulation member 31 located therebetween.

A conductive top plate 46 is located between the cap plate 20 and the plate terminal 22c of the positive terminal 22 to electrically connect the plate terminal 22c and the cap plate 20. That is, the cap plate 20 maintains an electrically connected state to the positive terminal 22.

By coupling the top plate 46 and the plate terminal 22c to an upper end portion of the rivet terminal 22a and by riveting or welding the upper end portion, the top plate 46 and the plate terminal 22c are fastened to an upper end portion of the rivet terminal 22a. The plate terminal 22c is installed at the outside of the cap plate 20 with the top plate 46 interposed therebetween.

A negative gasket 36 and a positive gasket 37 are installed between an inner surface of the terminal holes H1 and H2 of the cap plate 20 and the rivet terminals 21a and 22a of the negative terminal 21 and the positive terminal 22, respectively, and seal and electrically insulate the cap plate 20 and the rivet terminals 21a and 22a of the negative terminal 21 and the positive terminal 22.

The negative gasket 36 and the positive gasket 37 are further extended between the inside of the cap plate 20 and the flanges 21b and 22b to seal and electrically insulate the flanges 21b and 22b and the cap plate 20. That is, the negative gasket 36 and the positive gasket 37 prevent an electrolyte solution from leaking through the terminal holes H1 and H2 by installing the negative terminal 21 and the positive terminal 22 in the cap plate 20.

The negative electrode lead tab 51 and the positive electrode lead tab 52 electrically connect the negative terminal 21 and the positive terminal 22 to the negative electrode 11 and the positive electrode 12, respectively, of the electrode assembly 10. That is, by coupling the negative electrode lead tab 51 and the positive electrode lead tab 52 to a lower end portion of the rivet terminals 21a and 22a and by caulking the lower end portion, while the negative electrode lead tab 51 and the positive electrode lead tab 52 are supported by the flanges 21b and 22b, the negative electrode lead tab 51 and the positive electrode lead tab 52 are connected to a lower end portion of the rivet terminals 21a and 22a.

A negative insulation member 61 and a positive insulation member 62 are each installed between the negative electrode lead tab 51 and the positive electrode lead tab 52 and the cap plate 20 to electrically insulate the negative electrode lead tab 51 and positive electrode lead tab 52 and the cap plate 20.

Further, the negative insulation member 61 and the positive insulation member 62 are coupled to the cap plate 20 at one side and enclose the negative electrode lead tab 51, the positive electrode lead tab 52, the rivet terminals 21a and 22a, and the flanges 21b and 22b at the other side, thereby stabilizing a connection structure thereof.

In order to discharge an internal pressure and a generated gas of the rechargeable battery cell 100, the vent hole 24 is closed and sealed by a vent plate 25. When an internal pressure of the rechargeable battery cell 100 approaches a predetermined pressure, the vent plate 25 is cut out or fractured to open the vent hole 24. The vent plate 25 has a notch 25a that induces cutout or fracture.

Figure 3:
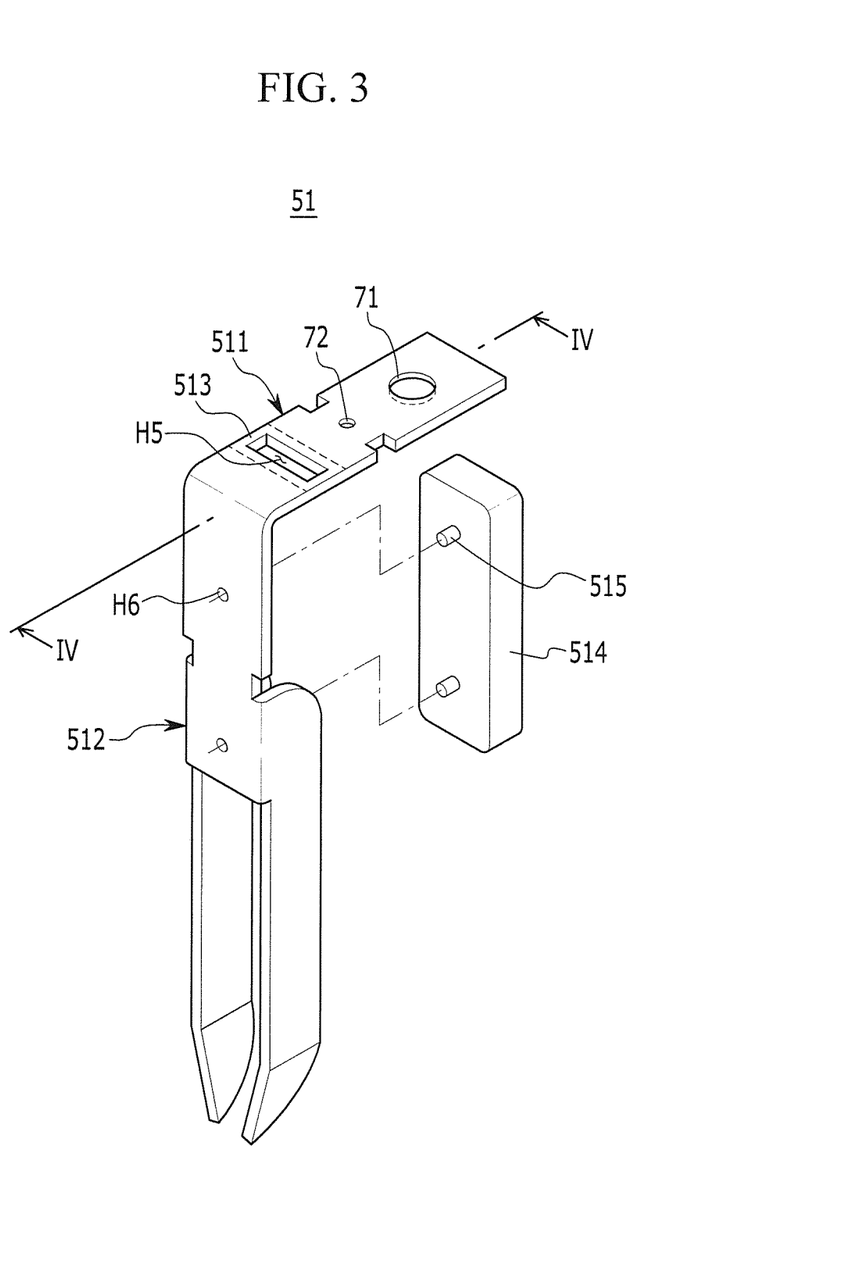
FIG. 3 is a perspective view of a lead tab of FIG. 2.
Figure 4:
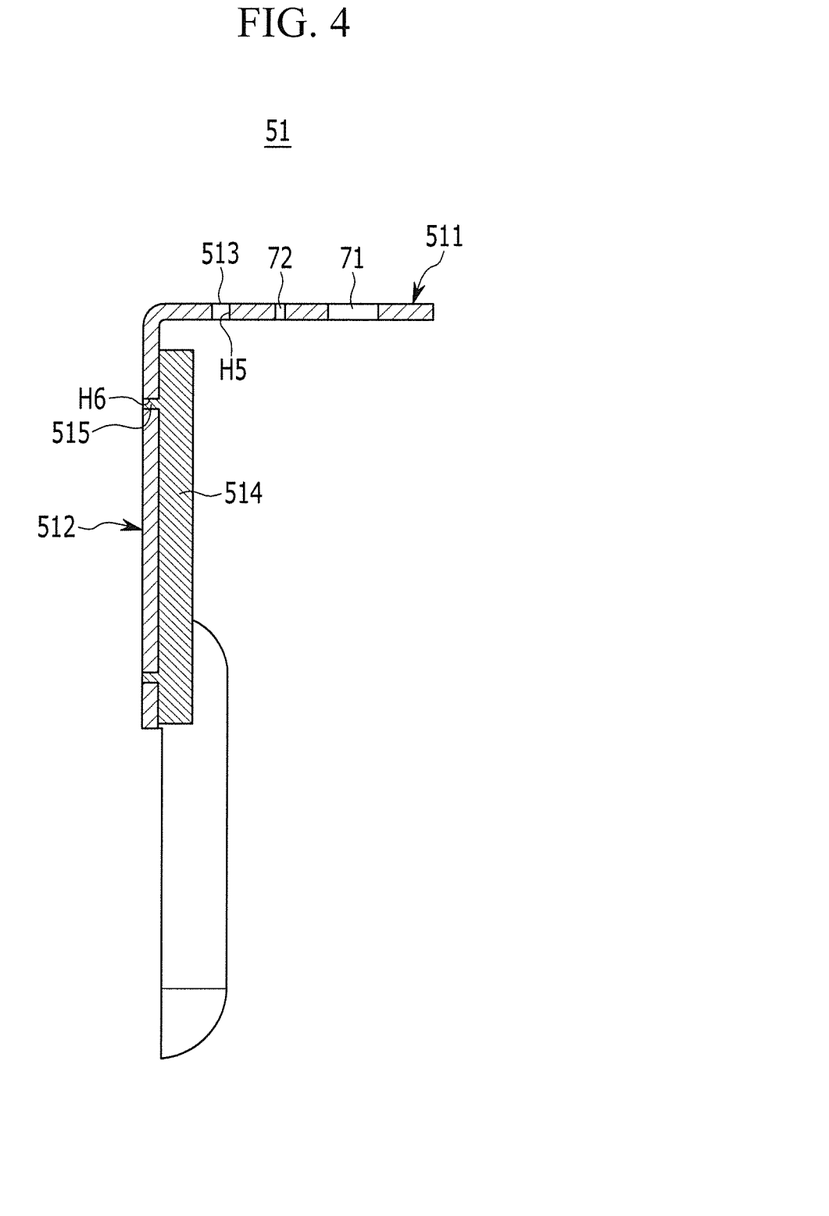
FIG. 4 is a cross-sectional view of the lead tab taken along line IV-IV of FIG. 3.

FIG. 3 is a perspective view of a lead tab of FIG. 2, and FIG. 4 is a cross-sectional view of the lead tab taken along line IV-IV of FIG. 3. The negative electrode lead tab 51 and the positive electrode lead tab 52 are formed in the same structure, and for convenience, the negative electrode lead tab 51 is exemplified.

Referring to FIGS. 3 and 4, the negative electrode lead tab 51 includes a first connection portion 511 that is connected to the rivet terminal 21a of the negative terminal 21, a second connection portion 512 that is bent from the first connection portion 511 to be connected to the negative uncoated region 11b of the electrode assembly 10, a cell fuse 513 that has a smaller area than a peripheral area in the first connection portion 511, and a heat dissipating member 514 that is separated from the cell fuse 513 to be provided in the second connection portion 512.

The first connection portion 511 includes through-holes 71 and 72 (see FIGS. 2 and 3) and is coupled to a lower end portion of the rivet terminal 21a and a lower protrusion 21d of the flange 21b. The second connection portion 512 is connected to the uncoated region 11b of the negative electrode 11 of the electrode assembly 10.

The cell fuse 513 is formed by removing a conductive portion by boring an area of hole H5 in the first connection portion 511 to interrupt a current between the first and second connection portions 511 and 512.

The heat dissipating member 514 is located adjacent to the cell fuse 513 within a range that does not disturb operation of the cell fuse 513. That is, the heat dissipating member 514 is located between the electrode assembly 10 and the second connection portion 512 (see FIG. 2). For example, the heat dissipating member 514 is provided in the second connection portion 512 to dissipate heat, thereby improving heat dissipating characteristics of the negative electrode lead tab 51 and the cell fuse 513.

The heat dissipating member 514 is formed as a metal block having excellent heat conductivity. For example, the heat dissipating member 514 may have the same or better heat conductivity than that of the negative electrode lead tab 51 forming the cell fuse 513. Further, even if the heat dissipating member 514 and the lead tab 51 are made from the same material, the heat dissipating member can have greater heat conductivity due to, for example, being a larger size or thickness.

The heat dissipating member 514 is installed by inserting a protrusion 515 that is provided at one side into a hole H6 that is provided at the second connection portion 512 and by welding or caulking an end portion of the protrusion 515. In this case, the heat dissipating member 514 is connected to the opposing second connection portion 512 through surface contact. Therefore, heat that is conducted from the electrode assembly 10 to the second connection portion 512 is rapidly dissipated through the heat dissipating member 514 through surface contact.

In other words, heat that is conducted from the negative electrode lead tab 51 of the electrode assembly 10 side to the cell fuse 513 is reduced or intercepted, and thus the cell fuse 513 is least affected by heat even in a low current area, an operation time thereof is extended, and thus the cell fuse 513 is maintained until a pack fuse is cut. Therefore, after the pack fuse is replaced, the rechargeable battery cell 100 having the cell fuse 513 can be continuously used.

Hereinafter, various exemplary embodiments of the present invention will be described. Constituent elements that are identical to or correspond to those of the first exemplary embodiment will be omitted, and only dissimilar constituent elements will be described here in detail.

Figure 5:
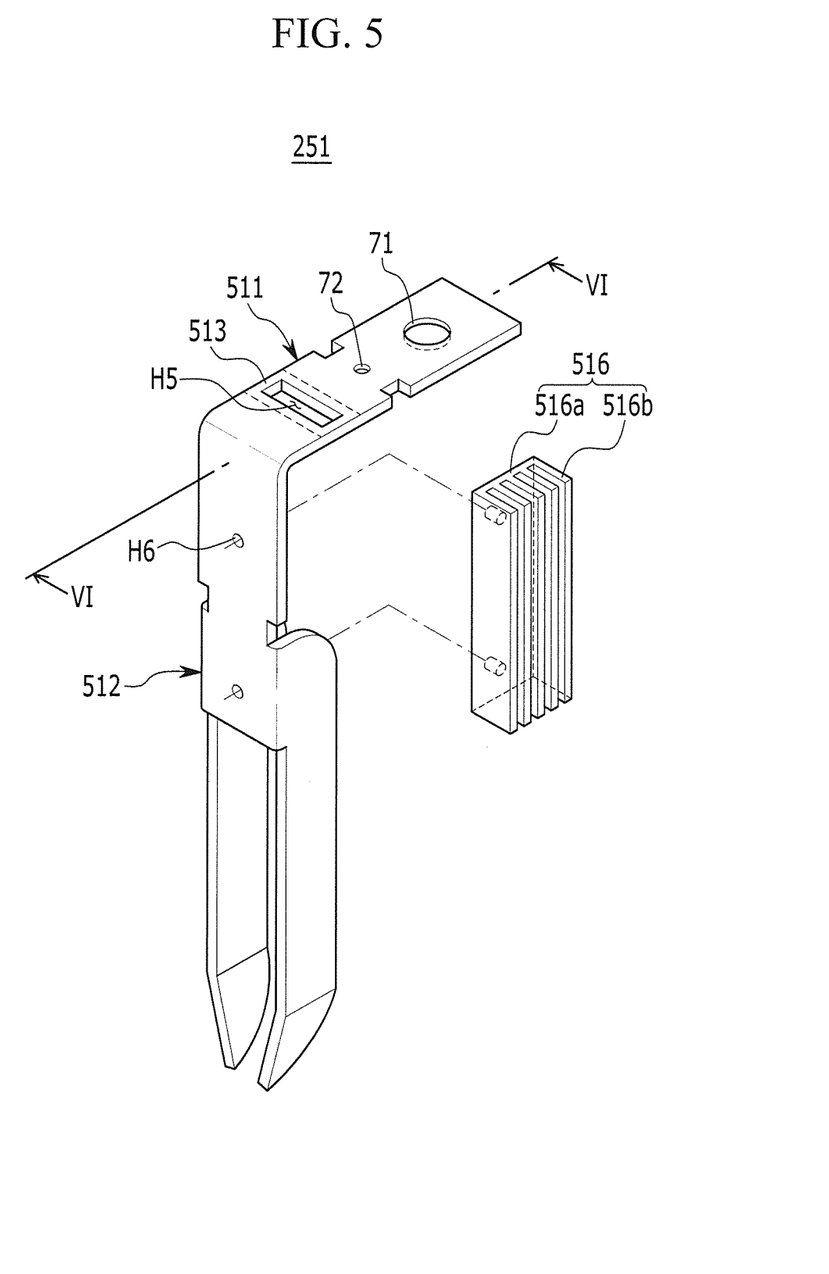
FIG. 5 is a perspective view of a lead tab in a rechargeable battery according to a second exemplary embodiment of the present invention.
Figure 6:
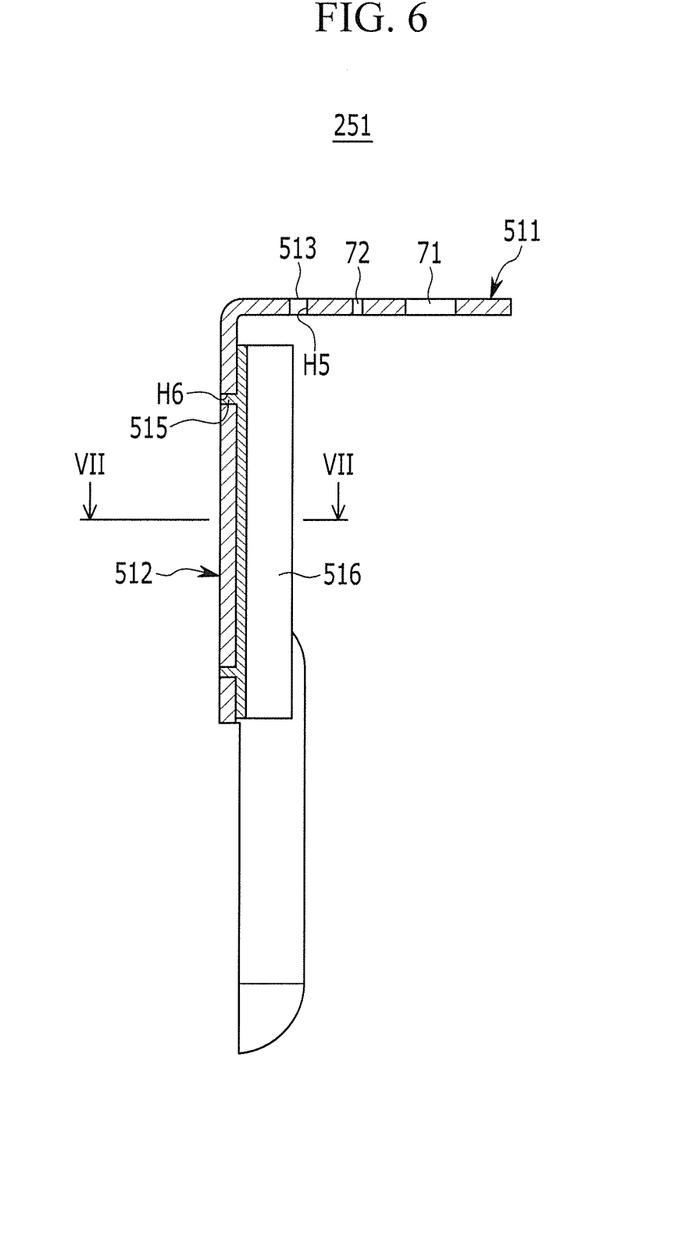
FIG. 6 is a cross-sectional view of the lead tab taken along line VI-VI of FIG. 5.
Figure 7:
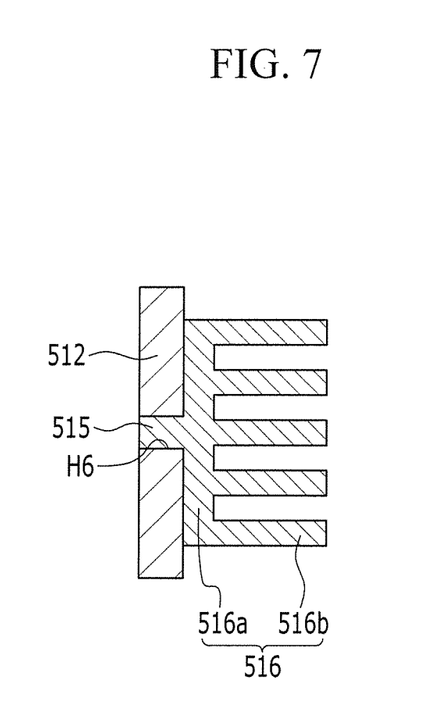
FIG. 7 is a cross-sectional view of the lead tab taken along line VII-VII of FIG. 6.

FIG. 5 is a perspective view of a lead tab in a rechargeable battery according to a second exemplary embodiment of the present invention, FIG. 6 is a cross-sectional view of the lead tab taken along line VI-VI of FIG. 5, and FIG. 7 is a cross-sectional view of the lead tab taken along line VII-VII of FIG. 6.

Referring to FIGS. 5 to 7, in the second exemplary embodiment, a negative electrode lead tab 251 includes a heat dissipating member 516 having a body 516a and heat dissipating fins 516b. That is, the heat dissipating member 516 that is formed with heat dissipating fins 516b forms a larger heat dissipating surface area than the heat dissipating member 514 that is formed with a block, thereby further improving heat dissipating performance.

The heat dissipating fins 516b are oriented in parallel in a thickness direction of the case 15 in the heat dissipating member 516 and extend in a vertical direction enabling easy vertical convection of heat within the case 15, thereby further improving heat dissipation characteristics of the negative electrode lead tab 251 and the cell fuse 513.

The heat dissipating member 516 is installed by inserting the protrusion 515 that is provided at one side into a hole H6 that is provided at the second connection portion 512 and by welding or caulking an end portion of the protrusion 515. In this case, the heat dissipating member 516 is connected to the opposing second connection portion 512 through surface contact. Therefore, heat that is conducted from the electrode assembly 10 to the second connection portion 512 is rapidly dissipated through the heat dissipating member 516 through surface contact.

In other words, heat that is conducted from the negative electrode lead tab 251 of the electrode assembly 10 side to the cell fuse 513 is reduced or intercepted, the cell fuse 513 is thus least affected by heat even in a low current area, and an operation time is extended, and thus the cell fuse 513 is maintained until a pack fuse is cut.

Figure 8:
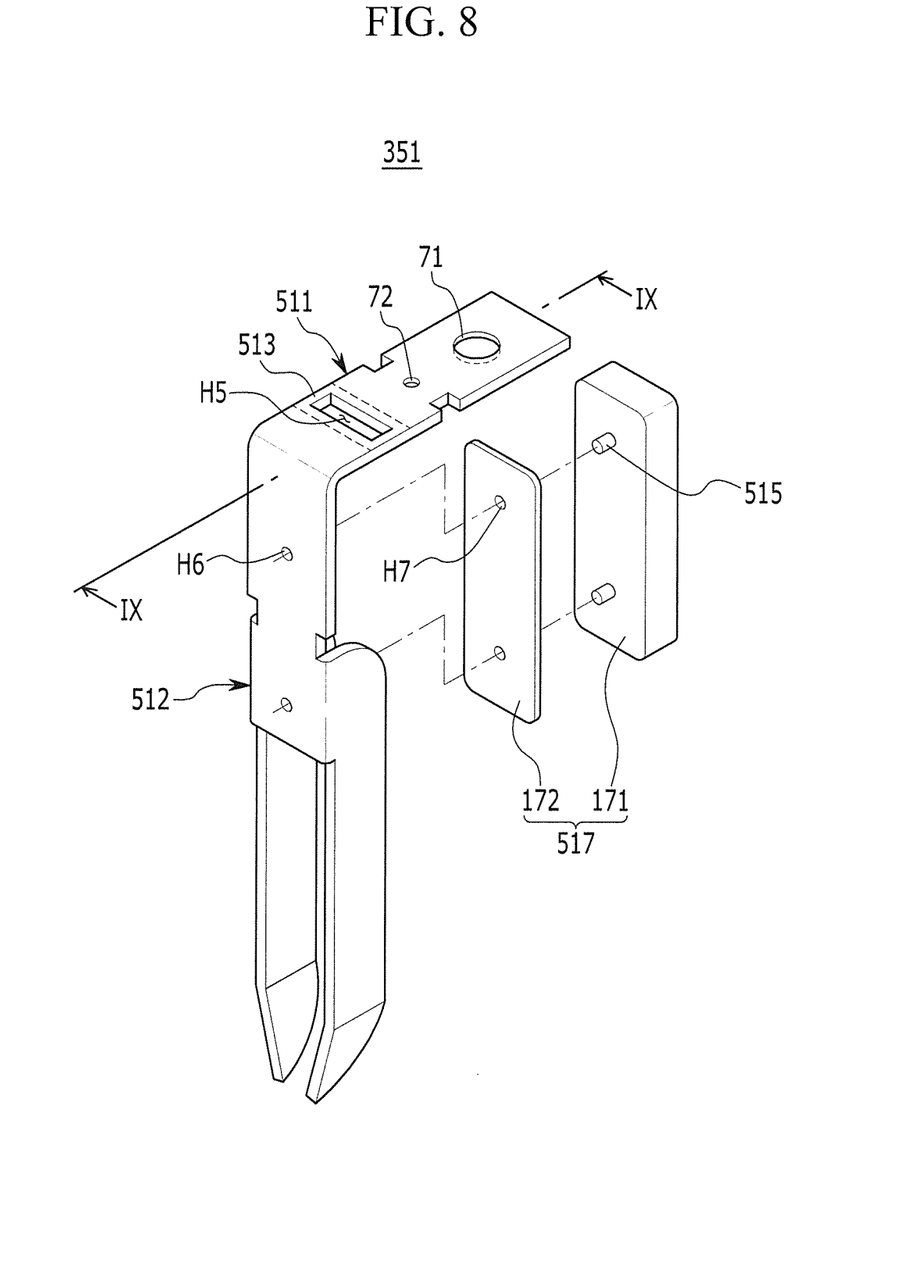
FIG. 8 is a perspective view of a lead tab in a rechargeable battery according to a third exemplary embodiment of the present invention.
Figure 9:
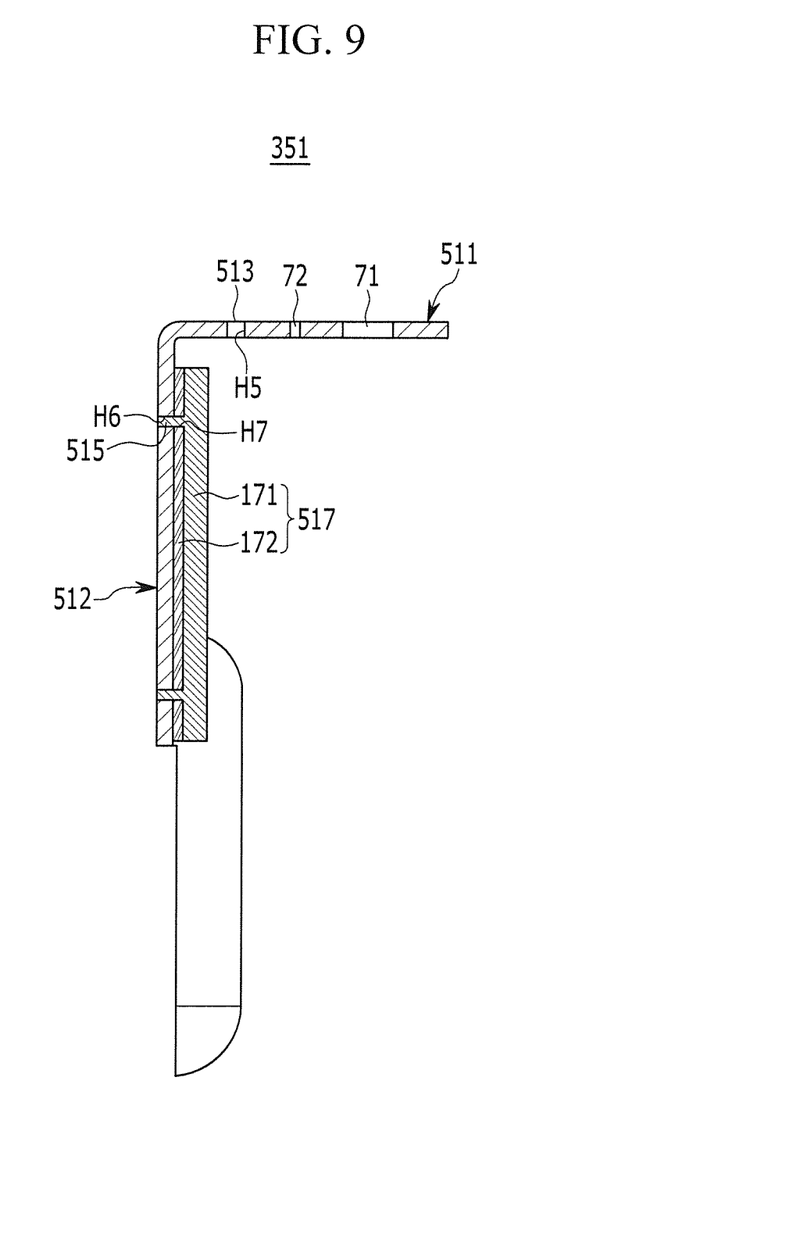
FIG. 9 is a cross-sectional view of the lead tab taken along line IX-IX of FIG. 8.

FIG. 8 is a perspective view of a lead tab in a rechargeable battery according to a third exemplary embodiment of the present invention, and FIG. 9 is a cross-sectional view of the lead tab taken along line IX-IX of FIG. 8.

Referring to FIGS. 8 and 9, in the third exemplary embodiment, in a negative electrode lead tab 351, a heat dissipating member 517 includes a block 171 and a thermally conductive plate 172. The block 171 is located between the electrode assembly 10 and the second connection portion 512 (see FIG. 2). The thermally conductive plate 172 is located between the block 171 and the second connection portion 512 (see FIGS. 8 and 9). The thermally conductive plate 172 has significantly better thermal conductivity than the block 171.

The heat dissipating member 517 is installed by inserting a protrusion 515 that is provided at one side of the block 171 into a hole H6 that is provided at the second connection portion 512 by penetrating a hole H7 that is provided at the thermally conductive plate 172 and by welding or caulking an end portion of the protrusion 515. In this case, the thermally conductive plate 172 is connected by through surface contact at the opposing second connection portion 512 and the block 171 at both surfaces. Therefore, heat that is conducted from the electrode assembly 10 to the second connection portion 512 is rapidly dissipated through the heat dissipating member 517 through surface contact, i.e., the thermally conductive plate 172 and the block 171.

In other words, a heat that is conducted from the negative electrode lead tab 351 of the electrode assembly 10 side to the cell fuse 513 is reduced or intercepted, the cell fuse 513 is thus least affected by a heat even in a low current area, and an operation time is extended, and thus the cell fuse 513 is maintained until a pack fuse is cut.

The thermally conductive plate 172 may be applied even to a second exemplary embodiment. That is, the thermally conductive plate 172 may be located between the second connection portion 512 and a heat dissipating fin 516 of a second exemplary embodiment.

Figure 10:
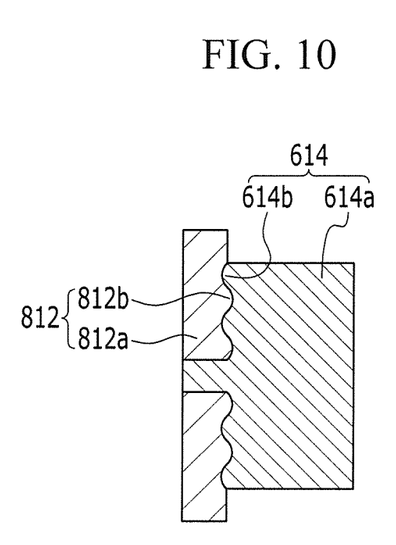
FIG. 10 is a cross-sectional view of a lead tab in a rechargeable battery according to a fourth exemplary embodiment of the present invention.

FIG. 10 is a cross-sectional view of a lead tab in a rechargeable battery according to a fourth exemplary embodiment of the present invention. Referring to FIG. 10, in the fourth exemplary embodiment, a second connection portion 812 and a heat dissipating member 614 are connected through a textured surface or curved surface contact.

In other words, the heat dissipating member 614 that is formed as a block 614a is formed with a textured or curved surface 614b toward the second connection portion 812, and the second connection portion 812 has a body 812a formed with a corresponding curved surface 812b toward the heat dissipating member 614. Accordingly, the second connection portion 812 and the heat dissipating member 614 form a wide surface contact area. Therefore, a heat that is conducted from the electrode assembly 10 to the second connection portion 812 is rapidly dissipated through the heat dissipating member 614 through surface contact.

Figure 11:
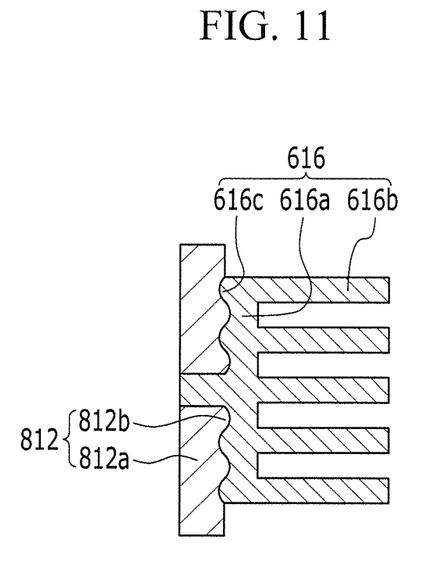
FIG. 11 is a cross-sectional view of a lead tab in a rechargeable battery according to a fifth exemplary embodiment of the present invention.

FIG. 11 is a cross-sectional view of a lead tab in a rechargeable battery according to a fifth exemplary embodiment of the present invention. Referring to FIG. 11, in the fifth exemplary embodiment, a second connection portion 812 and a heat dissipating member 616 are connected through a textured surface or curved surface contact.

In other words, the heat dissipating member 616 that has a body 616a and cooling fins 616b is formed with a textured or curved surface 616c facing toward the second connection portion 812, and the second connection portion 812 is formed with a body 812a and a corresponding curved surface 812b facing toward the heat dissipating member 616. Accordingly, the second connection portion 812 and the heat dissipating member 616 form a wide surface contact area. Therefore, heat that is conducted from the electrode assembly 10 to the second connection portion 812 is rapidly dissipated through the heat dissipating member 616 through surface contact with a wide heat dissipating area.

Figure 12:
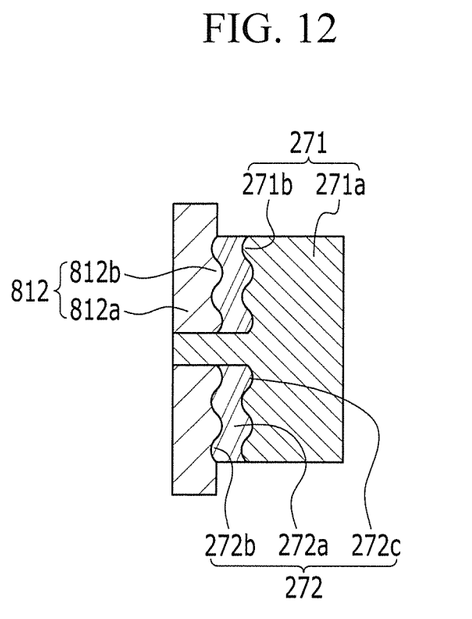
FIG. 12 is a cross-sectional view of a lead tab in a rechargeable battery according to a sixth exemplary embodiment of the present invention.

FIG. 12 is a cross-sectional view of a lead tab in a rechargeable battery according to a sixth exemplary embodiment of the present invention. Referring to FIG. 12, in the sixth exemplary embodiment, the second connection portion 812 and a heat dissipating member 271 are connected through a texture surface or a curved surface contact. Specifically, a block 271a and secondary member 272 including a thermally conductive plate 272a are connected through curved surface contact, and the thermally conductive plate 272 and the second connection portion 812 are connected through curved surface contact.

That is, the block 271a is formed with a curved surface 271b facing toward one surface of the thermally conductive plate 272, one surface of the thermally conductive plate 272 is formed with a corresponding curved surface 272c facing toward the block 271a, the other surface of the thermally conductive plate 272 is formed with a curved surface 272b facing toward the second connection portion 812, and the second connection portion 812 is connected with a corresponding curved surface 812b facing toward the other surface of the thermally conductive plate 272.

Accordingly, the second connection portion 812, the thermally conductive plate 272, and the block 271 have a wide surface contact area. Therefore, in the electrode assembly 10, heat that is conducted to the second connection portion 812 is rapidly dissipated through the thermally conductive plate 272 and the block 271 through surface contact.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21: negative terminal | 21a, 22a: rivet terminal |
| 21b, 22b: flange | 21c, 22c: plate terminal |

-continued

| Description of Symbols | |
|---|---|
| 22: positive terminal | 24: vent hole |
| 25: vent plate | 25a: notch |
| 31: insulation member | 36, 37: negative gasket and positive gasket |
| 46: top plate | 51, 251, 351: negative electrode lead tab |
| 52: positive electrode lead tab | 71, 72: through-hole |
| 100: rechargeable battery cell | 171, 271: block |
| 172, 272: thermally conductive plate | |
| 511: first connection portion | |
| 512, 812: second connection portion | 513: cell fuse |
| 514, 516, 517, 614, 616, 617: heat dissipating member | |
| 515: protrusion | |
| H1, H2: terminal hole | H3, H4: through-hole |
| H5, H6, H7: hole | |

What is claimed is:

1. A rechargeable battery comprising:
an electrode assembly; a case housing the electrode assembly; a cap plate coupled to the case; a first electrode terminal on the cap plate;
a first lead tab electrically connecting the electrode assembly and the first electrode terminal, wherein the first lead tab has a cell fuse having an opening; and a heat dissipating member coupled to the first lead tab and entirely spaced from the cell fuse a heat dissipating member coupled to the first lead tab and entirely spaced from the cell fuse; wherein the heat dissipating member comprises a plurality of fins.

2. The rechargeable battery of claim 1, wherein the heat dissipating member comprises a protrusion in an opening of the first lead tab to couple the heat dissipating member to the first lead tab.

3. The rechargeable battery of claim 1, wherein the heat dissipating member has a textured surface and wherein the first lead tab has a textured surface accommodating the textured surface of the heat dissipating member.

4. The rechargeable battery of claim 1, wherein the cell fuse is spaced from edges of the first lead tab.

5. The rechargeable battery of claim 1 further comprising a second electrode terminal on the cap and a second lead tab having a cell fuse and electrically connecting the electrode assembly to the second electrode terminal, wherein another heat dissipating member is on the second lead tab.

6. The rechargeable battery of claim 1, wherein a heat conductivity of the heat dissipating member is greater than a heat conductivity of the first lead tab.

7. The rechargeable battery of claim 1, wherein the heat dissipating member and the first lead tab each have a textured surface, wherein the textured surface of the heat dissipating member is accommodated by the textured surface of the first lead tab.

8. The rechargeable battery of claim 1, wherein the first lead tab further comprises a first connection member coupled to the first electrode terminal and a second connection member coupled to the electrode assembly, wherein the heat dissipating member is on the second connection member.

9. The rechargeable battery of claim 8, wherein the heat dissipating member is a body located between the electrode assembly and the second connection member.

10. The rechargeable battery of claim 8, wherein the heat dissipating member is welded or soldered to the second connection member.

11. The rechargeable battery of claim 1, wherein the heat dissipating member comprises a body and a thermally conductive plate coupled to the body.

12. The rechargeable battery of claim 11, wherein the thermally conductive plate is between the body and the first lead tab.

13. The rechargeable battery of claim 11, wherein the body comprises a protrusion in an opening H7 of the thermally conductive plate and in an opening H6 of the first lead tab.

14. The rechargeable battery of claim 11, wherein the thermally conductive plate has a textured surface, and wherein the body and the first lead tab each have a textured surface accommodating the textured surface of the thermally conductive plate.

* * * * *